(12) United States Patent
Kavosh et al.

(10) Patent No.: US 8,029,637 B2
(45) Date of Patent: Oct. 4, 2011

(54) SYSTEM, METHOD AND APPARATUS FOR ULTRAVIOLET CURING OF ADHESIVES WITH LIGHT BEAM SHAPING IN DISK DRIVE MANUFACTURING

(75) Inventors: Iraj Kavosh, San Jose, CA (US); Russell Dean Moates, San Jose, CA (US)

(73) Assignee: Hitachi Global Technologies Netherlands, B.V., Amsterdam (NL)

( * ) Notice: Subject to any disclaimer, the term of this patent is extended or adjusted under 35 U.S.C. 154(b) by 821 days.

(21) Appl. No.: 11/946,956

(22) Filed: Nov. 29, 2007

(65) Prior Publication Data
US 2009/0139652 A1 Jun. 4, 2009

(51) Int. Cl.
*B32B 38/00* (2006.01)

(52) U.S. Cl. ............... 156/272.8; 156/275.5; 156/275.7; 359/641

(58) Field of Classification Search ............... 156/272.2, 156/272.8, 275.5, 275.7; 359/641, 362, 355, 359/710
See application file for complete search history.

(56) References Cited

U.S. PATENT DOCUMENTS

| | | | |
|---|---|---|---|
| 4,411,931 A | 10/1983 | Duong | |
| 5,028,358 A | 7/1991 | Blum | |
| 5,095,386 A * | 3/1992 | Scheibengraber | 359/668 |
| 5,498,444 A | 3/1996 | Hayes | |
| 5,684,908 A * | 11/1997 | Kross et al. | 385/125 |
| 6,061,206 A * | 5/2000 | Foisy et al. | 360/265.7 |
| 6,149,856 A | 11/2000 | Zemel et al. | |
| 6,424,318 B1 | 7/2002 | Bergstedt et al. | |
| 6,717,745 B2 * | 4/2004 | Nemes | 359/710 |
| 6,759,664 B2 | 7/2004 | Thompson et al. | |
| 7,094,665 B2 | 8/2006 | Shimoda et al. | |
| 7,128,943 B1 | 10/2006 | Djeu | |
| 2003/0131932 A1 * | 7/2003 | Hoult et al. | 156/272.8 |
| 2005/0200958 A1 | 9/2005 | Hirai | |
| 2006/0165904 A1 | 7/2006 | Ohara | |
| 2006/0249078 A1 | 11/2006 | Nowak et al. | |

FOREIGN PATENT DOCUMENTS

| | | |
|---|---|---|
| JP | 02120704 | 8/1990 |
| JP | 10153750 | 9/1998 |
| JP | 10233354 A * | 9/1998 |

OTHER PUBLICATIONS

Dymax, Blue Wave 200 UV Spot Light System, Dymax Corporation, Product Bulletin, 2001.
Leconte, Chris, et al., Optimization of UV Curing Process for Adhesive Bonding in Medical Device Assembly, Application Note 89, EXFO Electro-Optical Engineering Inc., 2002.
Mank, Arjan, UV Curing of Optical Pick-Up Lenses, Application Note 11, Philips Research, Sep. 2004.

(Continued)

*Primary Examiner* — Richard Crispino
*Assistant Examiner* — Daniel McNally

(57) ABSTRACT

UV curing of adhesives with light beam shaping utilizes a spot curing process that focuses a limited amount of UV light onto a target area, such as glue dots. A focusing lens may be used to direct the UV light beam to the target area. The target areas have different geometrical shapes, and the UV light is advantageously concentrated in a more efficient manner. Beam-shaping optics or lenses are used to facilitate re-shaping and re-defining the UV-light beam. The UV beam may be defined and limited to a rectangular spot to improve the spot process quality and efficiency.

11 Claims, 3 Drawing Sheets

OTHER PUBLICATIONS

Hayes, Donald, et al., Opto-Electronic Packaging Enabled by Direct Write Micro-Printing Technology, MicroFab Technologies, Inc., Mar. 2005.

Globalspec, About UV Curing Equipment, http://process-equipment.globalspec.com, Dec. 2006.

Cox, W.R., et al., Microjet Printing for Low Cost Optical Interconnects, MicroFab Technologies, Inc., http://www.microfab.com, Dec. 2006.

Hoyacandeo Optronics Corporation, Spot UV Light Source, http://www.hoyacandeo.co.jp, Dec. 2006.

Findguru, Xenon Lamps, http://www.findguru.com, Dec. 2006.

* cited by examiner

SYSTEM, METHOD AND APPARATUS FOR ULTRAVIOLET CURING OF ADHESIVES WITH LIGHT BEAM SHAPING IN DISK DRIVE MANUFACTURING

BACKGROUND OF THE INVENTION

1. Technical Field

The present invention relates in general to curing adhesives and, in particular, to an improved system, method, and apparatus for ultraviolet curing of adhesives with light beam shaping.

2. Description of the Related Art

In the prior art, some manufacturing materials are applied as fluids and then cured (i.e., set or hardened) with light or heat treatment processes. For example, some liquid adhesives are cured with ultraviolet (UV) light. These classes of materials are widely utilized in various types of industries.

In the production of hard disk drives, one such application is the head stack assembly (HSA). HSA assembly utilizes a liquid or gel adhesive during the fabrication process to join some of the components. In one example, small dots of glue are used to attach the integrated lead suspension (ILS) to the actuator comb in order to improve the dynamics of the disk drive. The assembly process typically utilizes "oven flood UV curing" to set the liquid glue dots, which comprises indiscriminately flooding an entire array of the assemblies with UV light. Although this type of processing for UV-cured adhesives is workable, an improved solution that more selectively cures adhesives would be desirable.

SUMMARY OF THE INVENTION

Embodiments of a system, method, and apparatus for curing of adhesives with light beam shaping are disclosed. The invention may comprise a UV-spot curing process that focuses a limited amount of UV light onto a target area, such as glue dots. A focusing lens may be used to direct the UV light beam to the target area. In some embodiments, the target areas have different geometrical shapes, and the UV light is advantageously concentrated in a more efficient manner.

In one approach beam-shaping optics or lenses are used to facilitate re-shaping and re-defining the UV-light beam. For example, the UV beam may be defined and limited to a rectangular spot to improve the spot process quality and efficiency. Utilizing beam-shaping optics to shape and define a focused light beam in glue dot curing processes enhances the quality efficiency and effectiveness of the manufacturing process, as well as the efficiency in utilizing UV power.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
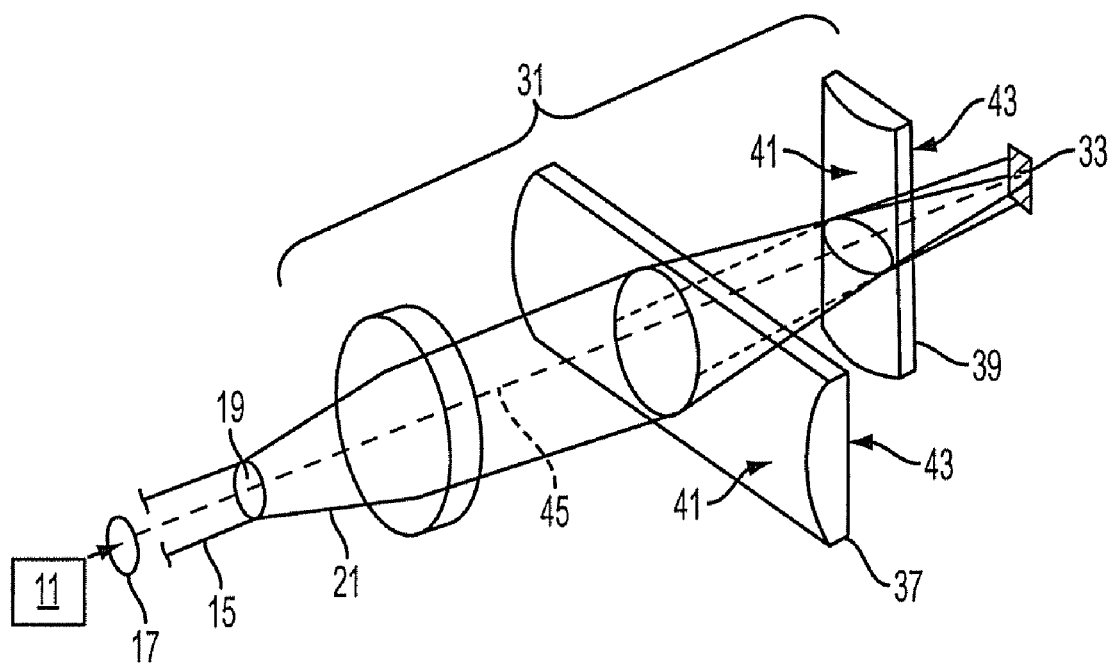
FIG. 1 is a schematic isometric view of one embodiment of a light and lens assembly constructed in accordance with the invention.

Referring to FIGS. 1-4, embodiments of a system, method and apparatus for curing adhesives with light beam shaping are disclosed. As schematically depicted in FIG. 1, one embodiment of the invention comprises a system for shaping a light beam, such as ultraviolet (UV) light. The system includes a light source 11 for emitting light 13. A light guide 15 having an inlet end 17 receives the light 13 from the light source 11, and an outlet end 19 for emitting light 21 conveyed through the light guide 15. As shown in FIG. 1, the emitted light 21 may diverge from outlet end 19.

A lens assembly 31 is located adjacent to the outlet end 19 of the light guide 15. The lens assembly 31 is provided for collimating the emitted light and forming a desired geometric-shaped light beam 33 (e.g., a rectangle, square, etc.). The lens assembly 31 comprises a plurality of lenses including, e.g., a spherical collimating lens 35 and at least one other lens element 37, 39 (e.g., two shown). The spherical collimating lens 35 is located closest to the outlet end 19. The light guide 15 may emit the diverging beam 21 such that it passes through the spherical collimating lens 35 prior to passing through the other lens elements 37, 39.

Again as shown in FIG. 1, the lens elements 37, 39 may comprise a pair of cylindrical lenses. Each of the cylindrical lenses 37, 39 may be provided with a convex leading surface 41 and a planar trailing surface 43 that are normal to an axis 45 of the emitted light. In addition, the cylindrical lenses 37, 39 may be rotated and positioned 90 degrees out of phase relative to each other as illustrated. Each of the lenses that form the lens assembly 31 may be varied in distance relative to each other, the outlet end 19, and the target struck by beam 33 to alter the pattern aspect ratio or other features of the invention. Position, focal length, and power of each lens may be varied to achieve a desired shape or size.

Figure 2:
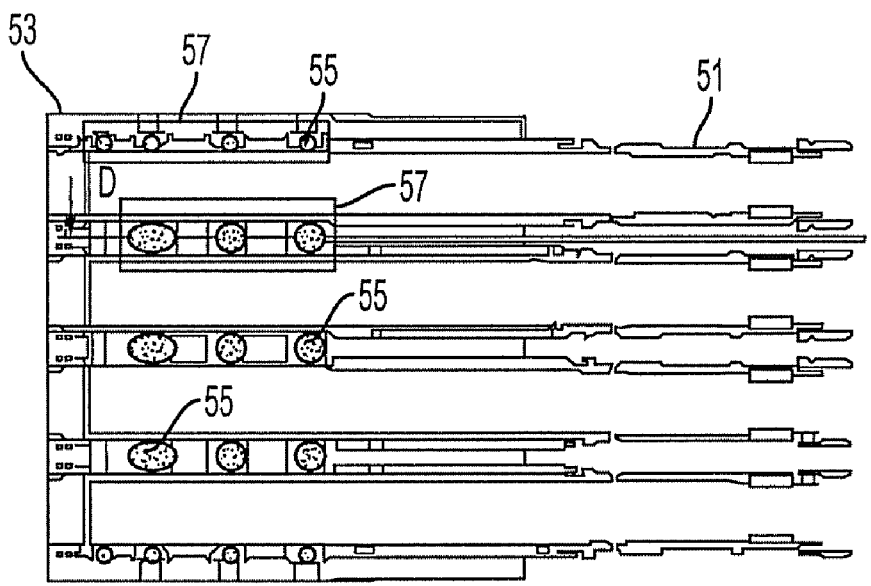
FIG. 2 is an isometric view of one embodiment of adhesive-joined assembly that was cured by the light and lens assembly of FIG. 1 and is constructed in accordance with the invention.

The invention has many useful applications, such as a method of assembling hard disk drive components as shown in FIG. 2. For example, a plurality of integrated lead suspensions 51 (ILS) may be assembled to an actuator comb 53 with adhesive drops 55. The adhesive drops may be sized and shaped (e.g., circular, oval, etc.) according to the application, but must be cured to complete the assembly. Typically, the adhesive drops 55 are applied in a shaped pattern 57 (e.g., a rectangle). The adhesive drops 55 may be cured individually or simultaneously in their respective patterns 57.

In one embodiment of the method (FIG. 4), the process begins as indicated and comprises positioning an actuator comb (e.g., arms) adjacent to an integrated lead suspension (ILS) (step 61); applying a plurality of adhesive drops in a pattern to the actuator comb and ILS such that that adhesive drops extend between the actuator comb and ILS to form an assembly (step 63); providing light from a light source and directing the light through a light guide having an outlet end for emitting light conveyed through the light guide (step 65); and passing the emitted light through a lens assembly located between the outlet end and the assembly for collimating the emitted light and forming a desired geometric-shaped light beam that is contoured to the shape of the pattern of adhesive drops to cure the adhesive drops and form a bond between the actuator comb and the ILS (step 67), before ending as indicated.

In other embodiments, the method may comprise providing the lens assembly as a plurality of lenses, as a spherical collimating lens and at least one other lens element, such as a pair of cylindrical lenses. The collimating lens may be located adjacent to the outlet end such that the light guide emits a diverging beam that passes through the collimating lens prior to passing through said at least one other lens element.

Each of the cylindrical lenses may be provided with a convex leading surface and a planar trailing surface that are normal to an axis of the emitted light. The method may further comprise rotating and positioning the cylindrical lenses 90 degrees out of phase relative to each other. In addition, the light source may emit UV light, and the desired geometric-shaped light beam may comprise a rectangular light beam.

Figure 3:
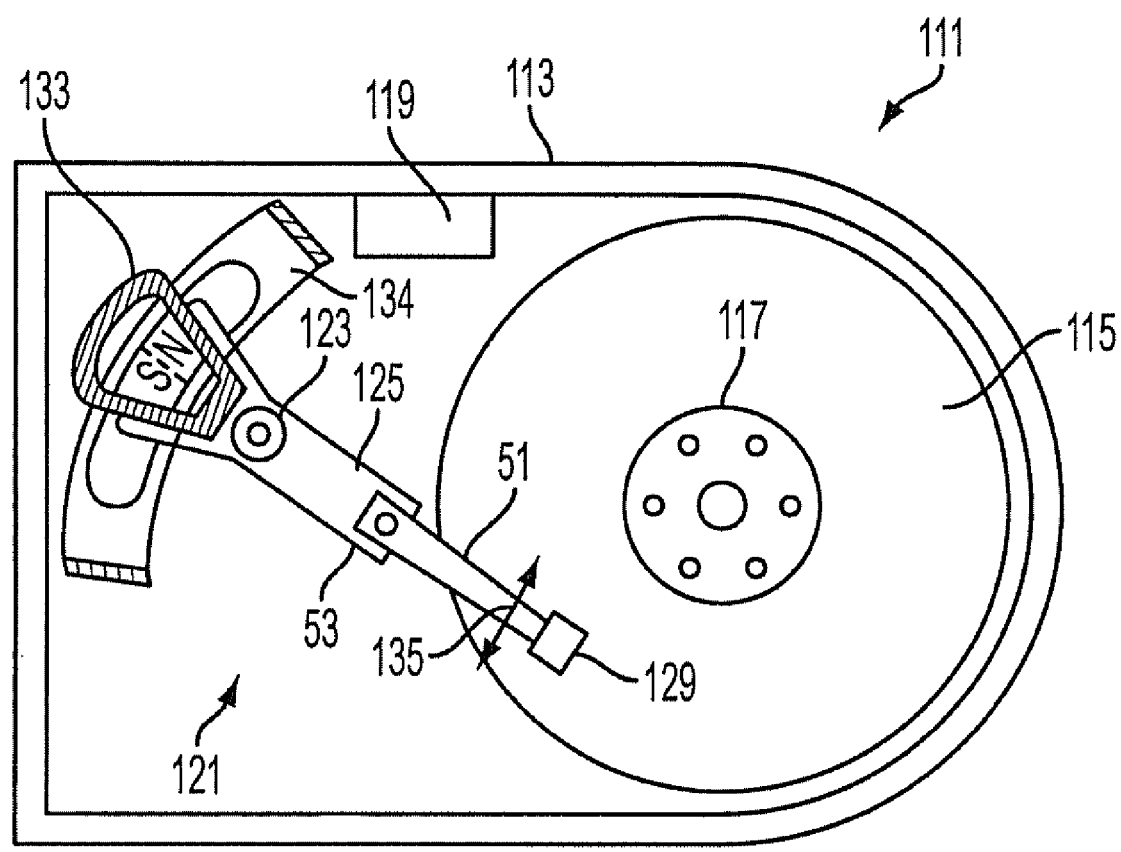
FIG. 3 is a schematic diagram of one embodiment of a disk drive constructed in accordance with the invention.
Figure 4:
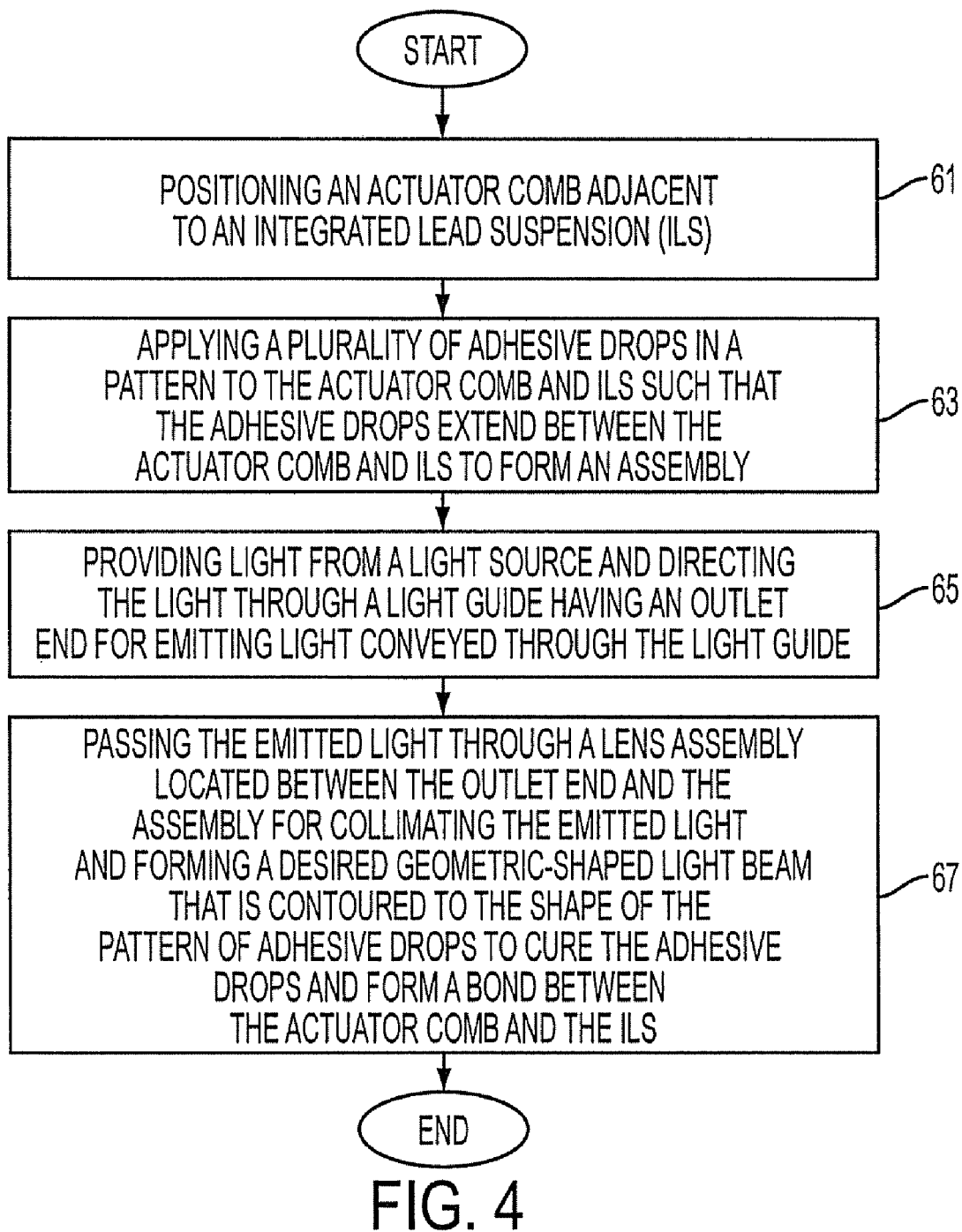
FIG. 4 is a high level flow diagram of one embodiment of a method constructed in accordance with the invention.

Referring now to FIG. 3, a schematic drawing of one embodiment of an information storage system comprising a magnetic hard disk file or drive 111 for a computer system is shown and is constructed in accordance with the invention. Drive 111 has an outer housing or base 113 containing at least one magnetic disk 115. Disk 115 is rotated by a spindle motor assembly having a central drive hub 117. An actuator 121 comprises one or more parallel actuator arms 125 in the form of the comb 53 that is pivotally mounted to base 113 about a pivot assembly 123. A controller 119 is also mounted to base 113 for selectively moving the comb of arms 125 relative to disk 115.

In the embodiment shown, each arm 125 has extending from it at least one (e.g., eight shown in FIG. 2) cantilevered load beam and suspension 51, and is assembled as described above. A magnetic read/write transducer or head is mounted on a slider 129 and secured to a flexure that is flexibly mounted to each suspension 51. The read/write heads magnetically read data from and/or magnetically write data to disk 115. The level of integration called the head gimbal assembly is the head and the slider 129, which are mounted on suspension 51. The slider 129 is usually bonded to the end of suspension 51. The head is typically formed from ceramic or intermetallic materials and is pre-loaded against the surface of disk 115 by suspension 51.

Suspensions 127 have a spring-like quality which biases or urges the air bearing surface of the slider 129 against the disk 115 to enable the creation of the air bearing film between the slider 129 and disk surface. A voice coil 133 housed within a voice coil motor magnet assembly 134 is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks.

While the invention has been shown or described in only some of its forms, it should be apparent to those skilled in the art that it is not so limited, but is susceptible to various changes without departing from the scope of the invention.

What is claimed is:

1. A method of assembling hard disk drive components, comprising:
 (a) positioning an actuator comb adjacent to an integrated lead suspension (ILS);
 (b) applying a plurality of adhesive drops in a pattern to the actuator comb and ILS such that the adhesive drops extend between the actuator comb and ILS to form an assembly;
 (c) providing light from a light source and directing the light through a light guide having an outlet end for emitting light conveyed through the light guide; and
 (d) passing the emitted light from the outlet end of the light guide through a lens assembly comprising a collimating lens and a pair of cylindrical lenses, the lens assembly being located between the outlet end of the light guide and the assembly for collimating the emitted light and forming a rectangular light beam that is contoured to the shape of the pattern of adhesive drops to cure the adhesive drops and form a bond between the actuator comb and the ILS.

2. A method according to claim 1, wherein the collimating lens is located adjacent to the outlet end and light guide emits a diverging beam that passes through the collimating lens prior to passing through the cylindrical lenses.

3. A method according to claim 1, wherein each of the cylindrical lenses has a convex leading surface and a planar trailing surface that are normal to an axis of the emitted light.

4. A method according to claim 1, further comprising rotating and positioning the cylindrical lenses 90 degrees out of phase relative to each other.

5. A method of assembling hard disk drive components, comprising:
 (a) positioning an actuator comb adjacent to an integrated lead suspension (ILS);
 (b) applying a plurality of adhesive drops in a pattern to the actuator comb and ILS such that the adhesive drops extend between the actuator comb and ILS to form an assembly;
 (c) providing light from a light source and directing the light through a light guide having an outlet end for emitting light conveyed through the light guide;
 (d) positioning a lens assembly between the outlet end of the light guide and the assembly, the lens assembly comprising a spherical collimating lens and a pair of cylindrical lenses; and then
 (e) passing the emitted light from the light guide through the lens assembly for collimating the emitted light and forming a rectangular light beam that is contoured to the shape of the pattern of adhesive drops to cure the adhesive drops and form a bond between the actuator comb and the ILS.

6. A method according to claim 5, wherein the collimating lens is located adjacent to the outlet end and light guide emits a diverging beam that passes through the collimating lens prior to passing through the pair of cylindrical lenses.

7. A method according to claim 5, wherein each of the cylindrical lenses has a convex leading surface and a planar trailing surface that are normal to an axis of the emitted light.

8. A method according to claim 5, wherein the light source emits UV light, and further comprising:
 rotating and positioning the cylindrical lenses 90 degrees out of phase relative to each other.

9. A method of assembling hard disk drive components, comprising:
 (a) positioning an actuator comb adjacent to an integrated lead suspension (ILS);
 (b) applying a plurality of adhesive drops in a pattern to the actuator comb and ILS such that the adhesive drops extend between the actuator comb and ILS to form an assembly;

(c) providing UV light from a light source and directing the light through a light guide having an outlet end for emitting light conveyed through the light guide;

(d) positioning a lens assembly between the outlet end of the light guide and the assembly, the lens assembly comprising a spherical collimating lens and a pair of cylindrical lenses, and the collimating lens is located closest to the outlet end of the light guide; and then (e) emitting a diverging beam from the light guide first through the collimating lens prior to passing through pair of cylindrical lenses for collimating the diverging beam and forming a rectangular light beam that is contoured to the shape of the pattern of adhesive drops to cure the adhesive drops and form a bond between the actuator comb and the ILS.

10. A method according to claim 9, wherein each of the cylindrical lenses has a convex leading surface and a planar trailing surface that are both normal to an axis of the diverging beam.

11. A method according to claim 9, further comprising rotating and positioning the cylindrical lenses 90 degrees out of phase relative to each other.

* * * * *

UNITED STATES PATENT AND TRADEMARK OFFICE
CERTIFICATE OF CORRECTION

PATENT NO. : 8,029,637 B2  
APPLICATION NO. : 11/946956  
DATED : October 4, 2011  
INVENTOR(S) : Iraj Kavosh et al.

Page 1 of 1

It is certified that error appears in the above-identified patent and that said Letters Patent is hereby corrected as shown below:

Title page, item 73, ASSIGNEE, Line 1, please delete "Global Technologies" and insert therefore, --Global Storage Technologies--

Signed and Sealed this  
Twentieth Day of November, 2012

David J. Kappos  
*Director of the United States Patent and Trademark Office*